US009495257B2

United States Patent
Das et al.

(10) Patent No.: US 9,495,257 B2
(45) Date of Patent: Nov. 15, 2016

(54) NETWORKING SUPPORT FOR ZONE CLUSTERS BASED ON VIRTUALIZATION OF SERVERS

(71) Applicant: Oracle International Corporation, Redwood Shores, CA (US)

(72) Inventors: Tirthankar Das, Kolkata (IN); Thejaswini Singarajipura, Bangalore (IN); Sambit Nayak, Bhubanesnwar (IN); Honsing Cheng, San Francisco, CA (US)

(73) Assignee: Oracle International Corporation, Redwood Shores, CA (US)

(*) Notice: Subject to any disclaimer, the term of this patent is extended or adjusted under 35 U.S.C. 154(b) by 616 days.

(21) Appl. No.: 13/779,731

(22) Filed: Feb. 27, 2013

(65) Prior Publication Data

US 2014/0244718 A1    Aug. 28, 2014

(51) Int. Cl.
  *G06F 15/16*    (2006.01)
  *G06F 11/20*    (2006.01)
  *G06F 11/14*    (2006.01)
  *H04L 29/08*    (2006.01)
  *H04L 29/14*    (2006.01)

(52) U.S. Cl.
  CPC ....... *G06F 11/2007* (2013.01); *G06F 11/1425* (2013.01); *G06F 11/1484* (2013.01); *G06F 11/202* (2013.01); *G06F 11/2005* (2013.01); *H04L 67/10* (2013.01); *H04L 69/40* (2013.01)

(58) Field of Classification Search
  CPC ....................................................... G06F 11/20
  USPC ................................................. 709/203, 224
  See application file for complete search history.

(56) References Cited

U.S. PATENT DOCUMENTS

| | | | |
|---|---|---|---|
| 6,430,622 B1* | 8/2002 | Aiken, Jr. | H04L 29/12009 709/230 |
| 7,181,535 B1* | 2/2007 | Remael | H04L 29/06 709/242 |
| 8,200,738 B2 | 6/2012 | Roush et al. | |
| 8,429,304 B2* | 4/2013 | Shima | H04L 29/12009 370/389 |
| 2005/0063300 A1* | 3/2005 | Dominic | 370/216 |
| 2005/0138517 A1* | 6/2005 | Monitzer | 714/746 |
| 2011/0054677 A1* | 3/2011 | Liddell et al. | 700/236 |
| 2012/0215876 A1* | 8/2012 | Ohtake | 709/208 |
| 2012/0259972 A1 | 10/2012 | Bafna et al. | |
| 2013/0339544 A1* | 12/2013 | Mithyantha | 709/238 |

OTHER PUBLICATIONS

Oracle Solaris Cluster Concepts Guide, Part No. E35254, Oct. 2012, pp. 1-96.

* cited by examiner

*Primary Examiner* — David Lazaro
*Assistant Examiner* — Marie Georges Henry
(74) *Attorney, Agent, or Firm* — Iphorizons PLLC; Narendra Reddy Thappeta

(57) ABSTRACT

An aspect of the present invention provides a corresponding exclusive communication stack (e.g., TCP/IP stack) for each zone entity of a server system. In an embodiment, multiple server systems together implement a zone cluster containing such zone entities provided on corresponding server systems. As a result, when an application executing on a first zone entity of a first server is moved to a second zone entity of a zone cluster on a second server, the application continues to communicate using exclusive communication stack provided for the second zone entity. In view of the dedicated resources for network communication, applications executing in any zone entity of such a zone cluster, may have a desired level of predictable throughput performance and security for the communicated data packets.

17 Claims, 5 Drawing Sheets

NETWORKING SUPPORT FOR ZONE CLUSTERS BASED ON VIRTUALIZATION OF SERVERS

BACKGROUND OF THE INVENTION

1. Technical Field

The present disclosure relates generally to server virtualization, and more specifically to networking support for zone clusters based on virtualization of servers.

2. Related Art

A server generally contains hardware components (and associated software) for processing of instructions, storing of data/instructions, communication (both internally and with external components) and input/output. Due to such components, servers generally have the ability to support several applications, which are based on shared software such as operating systems, drivers, kernel, etc., as is well known in the relevant arts.

Virtualization is often employed based on servers to provide a view of multiple virtual machines on a physical machine. Typically, each virtual machine provides the view of an independent machine to the corresponding applications (executing on the machine). The underlying virtualization software may ensure that each of the virtual machines is allocated sufficient resources (processor time, memory space, etc.) in supporting the corresponding applications. Virtualization can also ensure that applications on each virtual machine are immune to any failures in other virtual machines.

Zone cluster is another approach employed across machines to provide a reliable platform for execution of applications. A zone cluster contains multiple zone entities, with each entity being potentially provided in a separate physical server. Applications are seamlessly migrated from one zone entity to another in case of failure of the zone entity/server or for addressing capacity constraints. A zone entity (of a corresponding cluster) may execute as one of the virtual machines provided on servers, and thus provides applications executing in the zone entity a view that the applications are executing within a physical machine dedicated to that zone.

Applications executing in zone entities require networking support to communicate with external client systems as well as for clustering-related operations (e.g., to migrate an application to another zone entity of the same zone cluster). Networking generally entails sending and receiving of data packets. It may be desirable to provide such networking support while meeting requirements related to one or more of reliability, security and fault tolerance.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention provides a corresponding exclusive communication stack (e.g., TCP/IP stack) for each zone entity of a server system. In an embodiment, multiple server systems together implement a zone cluster containing such zone entities provided on corresponding server systems. As a result, when an application executing on a first zone entity of a first server is moved to a second zone entity of a zone cluster on a second server, the application continues to communicate using exclusive communication stack provided for the second entity. In view of the dedicated resources for network communication, applications executing in any zone entity of such a zone cluster may have a desired level of predictable throughput performance and security for the communicated data packets.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
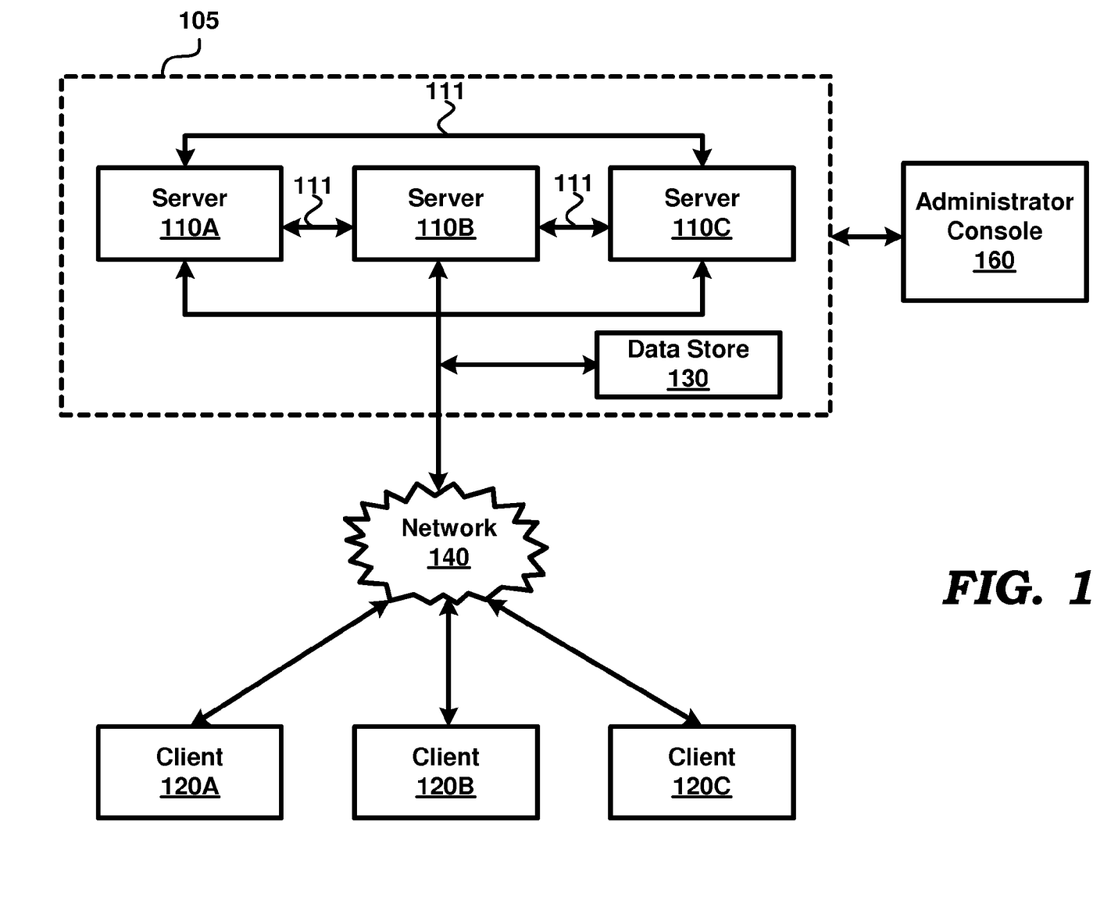
FIG. 1 is a block diagram illustrating an example computing system in which several aspects of the present invention can be implemented.

FIG. 1 is a block diagram illustrating an example environment in which several aspects of the present invention can be implemented. The block diagram is shown containing server systems (servers) 110A-110C, client systems (clients) 120A-120C, data store 130, network 140, and administrator console 160. Servers 110A-110C and data store 130 may be contained in physical site 105, which may correspond, for example, to a data center. Merely for illustration, only representative number/type of systems is shown in the Figure. Many environments often contain many more systems, both in number and type, depending on the purpose for which the environment is designed.

Network 140 provides connectivity between client systems 120A-120C and servers 110A-110C. Network 140 may be implemented using protocols such as Transmission Control Protocol (TCP) and/or Internet Protocol (IP) well known in the relevant arts. In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered.

Each of client systems 120A-120C represents a system such as a personal computer, workstation, mobile station, etc., used by users to generate (client) requests to enterprise applications/software (in general, applications) executing in servers 110A-110C. The requests (for using specific services provided by the softwares) may be generated using appropriate user interfaces. In general, a client system requests an application/software for performing desired tasks/services and receives corresponding responses containing the results of performance/processing of the requested tasks/services.

Administrator console 160 enables a user/administrator to configure one or more of servers 110A-110C (for example assigning IP addresses to zone entities within the servers), to deploy applications in the servers, to receive failure notifications from the servers, maintenance operations on servers 110A-110C, etc.

Data store 130 represents a non-volatile storage facilitating storage and retrieval of a collection of data by one or more enterprise applications/software executing in servers 110A-110C (typically while processing various client/user requests). Data store 130 may be implemented using relational database technologies and therefore provide storage and retrieval of data using structured queries such as SQL (Structured Query Language). Although not shown, site 105 may contain other data stores implemented as file stores to provide storage and retrieval of data in the form of one or more files organized as one or more directories, as is well known in the relevant arts.

Each of servers 110A-110C represents a physical machine (digital processing system) and may provide corresponding services to users of clients 120A-120C by executing corresponding applications. Some examples of servers 110A-110C include web/application server, email server etc. In general, each of servers 110A-110C is capable of executing (same/different) software sets based on business requirements, the hardware configuration of the physical machine, etc. The servers are shown connected by interconnects 111, with each interconnect providing reliable connectivity for the corresponding pair of servers. Alternative technologies (such as Ethernet/ATM based intra-networks) also can be used for such reliable connectivity between servers.

Servers 110A-110C may each be implemented to contain multiple zone entities. As noted above, each zone entity provides to applications executing within it a view that the applications are executing within a physical machine. An example of zone entity is that provided by Solaris 'container' in its operating system virtualization technique. Containers are described in further detail in a document entitled, "Advanced Oracle Solaris 11 System Administration (Solaris System Administration Series)", ISBN-13: 978-0133007176, by Bill Calkins. A failure of a zone entity may require only that zone entity to be 'rebooted', and the operations of other zone entities in a physical machine is generally not disturbed.

In addition, zone entities across multiple ones of servers 110A-110C are grouped to provide virtual clusters (zone clusters) for execution of applications. A zone cluster provides fault tolerance to an application executing within the zone cluster. For example, if one zone entity of a zone cluster (or the physical machine containing the zone entity) fails, the application is moved to another zone entity of the same zone cluster. Another benefit of zone clustering is that fast response times can be provided to services by techniques such as load balancing. An example of zone clustering is illustrated next with respect to FIG. 2.

3. Zone Cluster

Figure 2:
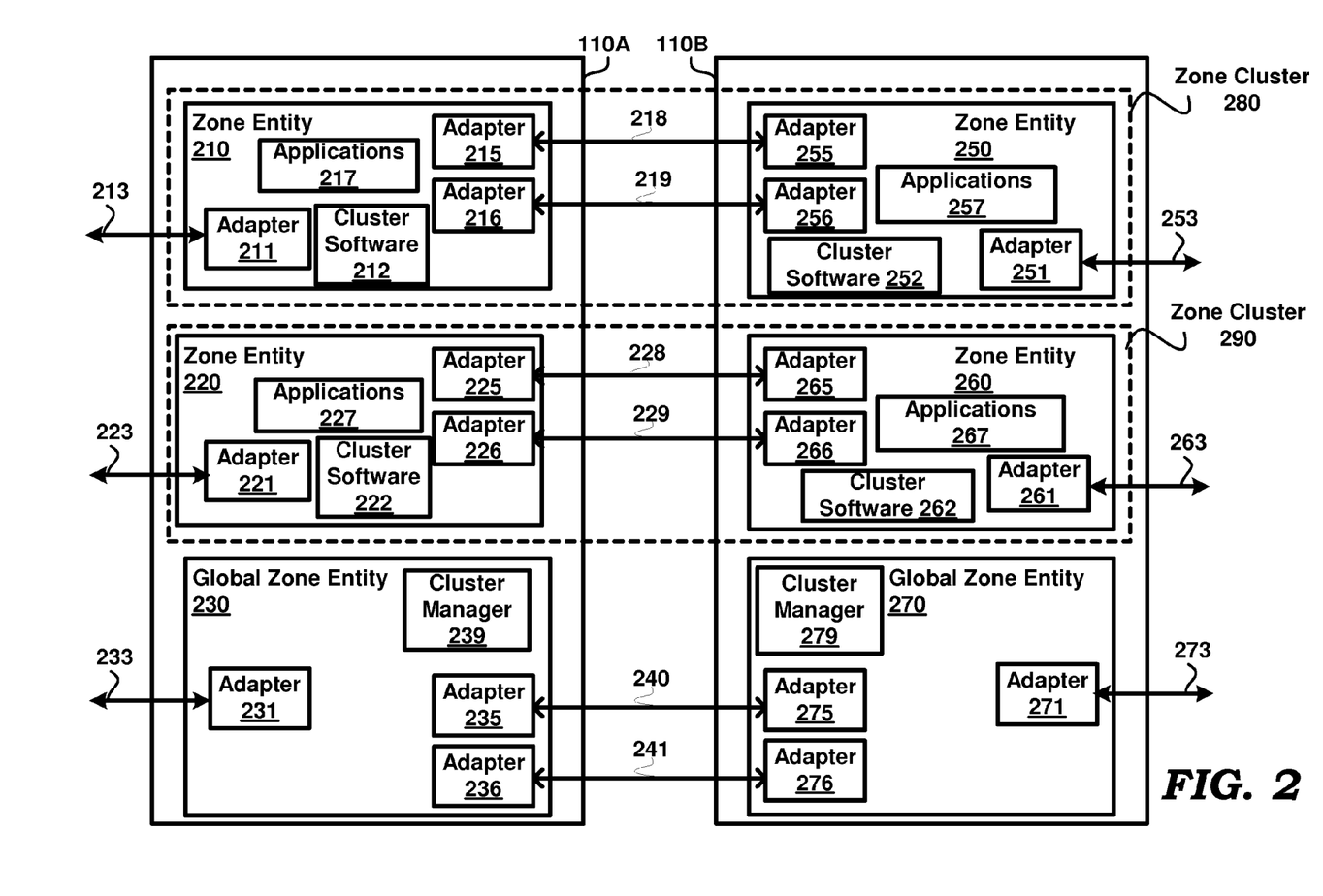
FIG. 2 is a block diagram illustrating the details of a server cluster in an embodiment.

FIG. 2 is a block diagram illustrating the implementation of zone clusters, in an embodiment of the present invention.

Server 110A is shown containing zone entities 210 and 220 and a global zone entity 230. Each of zone entities 210 and 220 provides corresponding mutually exclusive resources for execution of applications. Server 110B is shown containing zone entities 250 and 260 and a global zone entity 270. Each of zone entities 250 and 260 also provides corresponding mutually exclusive resources for execution of applications.

The combination of zone entities 210 and 250 forms zone cluster 280, while the combination of zone entities 220 and 260 forms zone cluster 290. Zone clustering provides security, resource management, fault tolerance and fault isolation capabilities. Security implies that an application executing in one zone cluster (e.g., zone cluster 280) does not have access to (or view of) resources, data, etc., allocated to any other zone cluster (e.g. zone cluster 290) or to the global zone entity (230 or 270). Resource management implies that an administrator can specifically control the allocation of resources to a zone cluster. For example, based on the requirements of the applications to be executed in zone entities of a zone cluster, the administrator can selectively assign more or fewer resources (CPU cycles, memory space, etc) to the zone entities of the zone cluster. Fault tolerance enables an application to be moved from a first zone entity (e.g., 210) of a zone cluster to a second zone entity (e.g., 250) of the same zone cluster in the event of failure of the first zone entity (e.g., 210). Fault isolation implies that any failure of zone entities 210 or 250 (belonging to zone cluster 280) or applications running in such zone entities, does not affect zone cluster 290

Zone entity 210 is shown containing adapters 211, 215 and 216, and applications 217. Applications 217 represents one or more applications deployed for execution in zone entity 210. As noted above, each application may process requests received from clients 120A-120C, and send back the result of processing of such requests. Applications 217 may use adapters 215/216 to communicate with their peer application 257 executing in zone entity 250.

Each of adapters 211, 215 and 216 represents a communication card (e.g., Ethernet card, or a hardware providing a high speed point-to-point communication facility). Public adapter 211 is used for communication with external clients 120A, etc., via network 140.

Private adapters 215 and 216 (on zone entity 210) along with private adapters 255 and 256 (on zone entity 250) form the basis for private paths 218 and 219, and thus used for private communication between the two zone entities 210 and 250. In case of adapters 215/216 (or equivalently in case of adapters 255/256 in zone entity 250), when both are operational/available, approaches such as packet striping (where data packets are sent on the two adapters alternately) are used for maximizing the transfer throughput using both the adapters.

The private interconnects may be used for various purposes. For example, packets may be used for coordination between scalable applications, where different instances of the same application are executed on zone entities (of the same zone cluster) of different servers. Any needed communication between peer applications (e.g., in 217 and 257) may be supported using the private interconnect. In addition, cluster software 212/252 may use the interconnect to forward packets directed to applications executing in zone entities executing in other servers.

Zone entity 250 is shown containing adapters 251, 255 and 256, and applications 257. Applications 257 represents one or more applications deployed for execution in zone entity 250. Each of adapters 251, 255 and 256 represents a communication card and are used similar to 211, 215 and 216 respectively. In the event of failure of zone entity 210, some or all of applications in applications 217 may be moved for execution in zone entity 250. Similarly, in the event of failure of zone entity 250, some or all of applications 257 may be moved for execution in zone entity 210.

Adapters 215, 216, 255 and 256 are assigned private IP addresses IPpriv215, IPpriv216, IPpriv255 and IPpriv256 for private communications (via paths 218 and/or 219) between zone entities 210 and 250. Adapters 225, 226, 265 and 266 are assigned private IP addresses IPpriv225, IPpriv226, IPpriv265 and IPpriv266 for communications (via paths 228 and/or 229) between zone entities 220 and 260.

Cluster softwares 212 and 252 provide various functions that enable applications 217 and 257 to operate in a single zone cluster 280. In an embodiment, a single public IP address is used for multiple public adapters 211 and 251 supporting the respective zone entities of a single zone cluster, with the IP address being plumbed on only one of the adapters at any given time. The IP address is plumbed on the other adapter (say 251) if the present adapter (211) becomes unusable for whatever reason (e.g., zone entity 210 being shut down, failure of communication path using adapter 211, etc.).

Thus, such single zone entity 210 (with the IP address plumbed) may receive packets from external clients, and the cluster software 212 of the zone entity thereafter forwards the received packet to the target application. If the target application 257 is executing in a different server system 110B (implementing the peer zone entity 250 of the same zone cluster 280), private interconnect 218/219 is used for such forwarding.

Each cluster software may configure private IP addresses on corresponding private adapters (i.e., within the same zone entity) when a zone entity is initialized (booted up), and removes the IP address (including the public IP address) from the adapters when the zone entity is shut down. Each cluster software may similarly manage (e.g., start, stop) corresponding applications 217/257 in conjunction with cluster manager 239/279 in global zone entity 230/270.

Zone cluster 290 is shown containing two zone entities 220 and 260, which are shown having private adapters (225, 226, 265, 266), public adapters (221, 261), cluster softwares (222, 262) and applications (227, 267), which operate similar to corresponding components described above with respect to zone cluster 280, and the description is not repeated for conciseness.

Global zone entity 230 is shown containing cluster manager 239, private adapters 235/236 and public adapter 231. Global zone entity 270 is shown containing cluster manager 279, private adapters 275/276 and public adapter 271. Though not shown, a global zone entity may host corresponding applications. Cluster managers 239 and 279 communicate (privately) with each other via private adapter-pairs 235/275 (over private path 240) and/or 236/276 (over private path 241). Cluster managers 239 and 279 may perform such communication as necessary to provide cluster management operations for creation of zone entities/clusters. Cluster managers 239 and 279 may also perform such communication to move applications in zone entities 210 and 220 to respective zone entities 250 and 260, in the event of failure of zone entities 210 and 220 respectively. Similarly cluster managers 239 and 279 may communicate with each other to decide to move applications in zone entities 250 and 260 to respective zone entities 210 and 220 in the event of failure of zone entities 250 and 260. Public adapters 231 and 271 respectively provide communication interfaces to external systems (e.g., clients 120A-120C). Paths 218/219, 228/229 and 240/241 are deemed to be contained in interconnect 111 between server 110A and server 110B.

Communications between applications in zone entities, communication between cluster software/managers of zone clusters, and communication between applications in zone entities and external systems (such as client systems 120A-120C) require networking support in the form of communication stacks. The manner in which such networking support is provided in embodiments of the present invention is described next.

4. Networking Support Using Exclusive TCP/IP Stacks

Figure 3A:
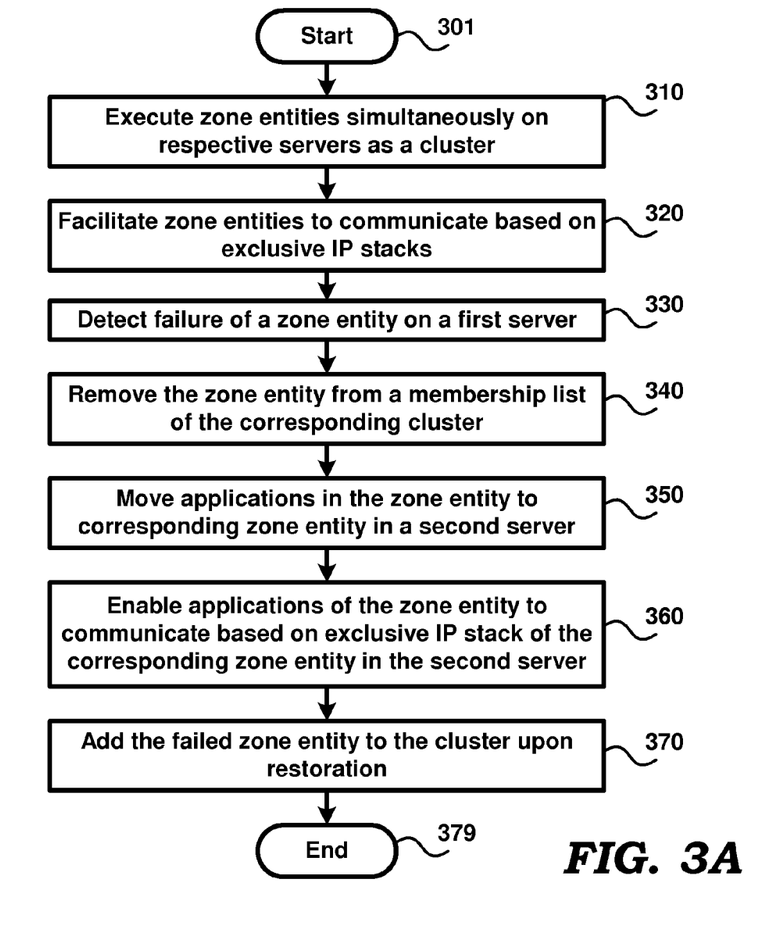
FIG. 3A is a flow chart illustrating the manner in which networking support is provided to applications executing in zone clusters according to an aspect of the present invention.

FIG. 3A is flowchart illustrating the manner in which networking support is provided in the context of zone clustering, in embodiments of the present invention. The steps in the flowchart are described with respect to FIGS. 1 and 2, and in a specific sequence merely for illustration. Alternative embodiments in other embodiments, and using a different sequence of steps can also be implemented without departing from the scope and spirit of several aspects of the present invention, as will be apparent to one skilled in the relevant arts by reading the disclosure provided herein. The flowchart starts in step 301, in which control passes immediately to step 310.

In step 310, zone entities are executed simultaneously as a cluster (zone cluster) on respective servers. Thus, for example, as shown above in FIG. 2, an administrator may create zone entities 210 and 250 on respective physical machines 110A and 110B, designate the combination of the entities 210 and 250 to be a single zone cluster 280, and schedule or deploy applications for execution in zone entities 210 and 250. The zone entities execute simultaneously (concurrently) on corresponding servers 110A/110B, which implies that applications executing in the zone entities also execute simultaneously and independently. Control then passes to step 320.

In step 320, communication between zone entities based on exclusive TCP/IP stacks is facilitated. An exclusive TCP/IP stack for a zone entity implies use of dedicated execution entities (threads, processes, etc.) for implementing the communication aspects for the corresponding zone entity. Thus, each of zone entities 210 and 220 in server system 110A is provided a respective set (one or more) of execution entities for communication. In other words, the execution threads used for transmitting/receiving packets corresponding to zone entity 210 is not shared for transmitting/receiving packets corresponding to zone entity 220. Control then passes to step 330.

In step 330, a cluster manager (e.g., 239) in association with the cluster software (212) in a zone entity (e.g., 210) detects failure of a zone entity (e.g., 210). Failure of a zone entity refers to a situation, which causes either all the executing applications or cluster functions inoperable with respect to corresponding function/utility. For example, failure of any private communication paths (e.g., 218 and 219 for zone cluster 280) for clustering, can be the basis for concluding that the zone entities on one or both sides (e.g., zone entities 210 or 250) has/have failed since the failover feature (that would be expected of cluster operation in normal conditions) would become inoperable. Control then passes to step 340.

In step 340, cluster manager 239 removes the failed zone entity 210 from a membership list of the corresponding zone cluster 280, by communicating with other cluster managers (e.g., 279). In the illustrative example of failure of zone entity 210 of cluster 280, zone entity 210 is removed from a membership list (containing members 210 and 250) of cluster 280. Control then passes to step 350.

In step 350, cluster manager 239 moves applications in the failed zone entity to the corresponding zone entity in a second server. For example, applications (applications 217) that were executing (or scheduled for execution) in zone entity 210 are moved to zone entity 250. Control then passes to step 360.

In step 360, the applications in the (new/moved to) zone entity, thereafter communicate with external clients using the same exclusive TCP/IP stack available for pre-existing applications in the same zone entity. Thus, assuming a first set of applications exist in zone 250 prior to moving of a second set of applications from zone entity 210, the second set of applications would also use the same exclusive TCP/IP stack (after the move) as that used by the first set of applications prior to the move.

In step 370, cluster manager 239 adds the failed zone entity 210 to cluster 280 upon restoration and the load of applications may again be distributed across both zones 210 and 250. The flow chart ends in step 379.

Due to the facility of providing exclusive TCP/IP stack support for the applications that have been moved from another zone entity, such moved applications also benefit from isolation from applications in other zone entities of the server (to which the applications are moved), as will be further clear from the description of exclusive TCP/IP stack below.

5. Exclusive TCP/IP Stack

Figure 3B:
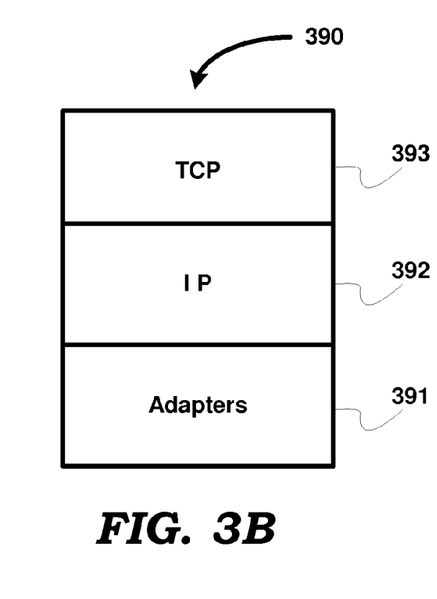
FIG. 3B is a block diagram illustrating the details of an exclusive TCP/IP stack in an embodiment.

FIG. 3B is a block diagram depicting the components of a TCP/IP stack in one embodiment. TCP/IP stack 390 is shown containing adapter(s) 391, IP layer 392 and TCP layer 393. Each block of FIG. 3B is described below in further detail.

Adapter(s) 391 represents the physical hardware and associated media access (link layer) software and memory storage. In an embodiment, adapter(s) 391 includes all the private and public adapters provided for the corresponding zone entity, e.g., adapters 211, 215 and 216 for zone entity 210. In other words, there is no shared adapter between zone entities 210 and 220. As a consequence, any processing within such dedicated adapters is viewed as being by non-shared processing entities executed by the hardware resources of the adapters themselves (to support the exclusive TCP/IP stack).

IP layer 392 represents the software instructions and the memory storage supporting the implementation of Internet Protocol (IP). TCP layer 393 represents the software instructions and the memory storage supporting the implementation of Transmission Control Protocol (TCP). IP Layer 392 may choose either the public adapter or one of the private adapter pairs for transmission of each packet, depending on the destination IP address (i.e., public adapter being used for external communications with clients, while private adapters are used for intra-cluster communications, etc., as described above). The specific adapter to be used (and the corresponding source IP address for the packet) may be determined by TCP or IP layers, in a known way.

It may be appreciated that the processors and memory may provide for many execution entities supporting corresponding applications, etc. However, the specific execution entities (thread, process, etc.) providing the IP layer 392 and TCP layer 393 (of zone entity 210) are not shared by other zone entities (220 and 230). Such non-shared execution entities are scheduled along with other execution entities by shared infrastructure such as operating systems and kernels, as is well known in the relevant arts.

As the processing entities for TCP, IP and adapters are non-shared with other entities, the approach operates to provide predictable guaranteed resources to each of the zone entities in the form of respective exclusive TCP/IP stack.

Due to the resulting exclusive allocation of various resources for each of the zone entities, each zone entity is isolated (not negatively affected in terms of performance, security, etc.) from operation of other zone entities. Thus, when applications move from one zone entity to another, the isolation related benefits continue to be obtained for the moved applications.

While the above description is provided to have a single TCP/IP stack for a zone entity, in alternative embodiments, multiple exclusive TCP/IP stacks (e.g., each dedicated for a particular destination such that one is provided for public adapter and another is provided for the private adapters together) may be employed for a single zone entity.

Similarly, while the exclusive TCP/IP stack is described above as having adapter(s) dedicated for a single zone entity, alternative embodiments may be employed with multiple zone entities sharing a single physical adapter. The processing and memory resources there may be partitioned for each of the sharing zone entities, such that the physical adapter is viewed as containing multiple virtual adapters, with each virtual adapter being dedicated to a single zone entity.

In addition, it may be appreciated that an exclusive IP stack is used for both inter-zone entity IP communications (e.g., when application 217 communicates with application 227 using TCP/IP) as well as inter-system communications (e.g., when application 217 communicates with application 257 in an external server or with client 120A over Internet).

An example embodiment illustrating additional details of implementation is described below.

6. Details of Server Implementation with Exclusive TCP/IP Stacks

Figure 4:
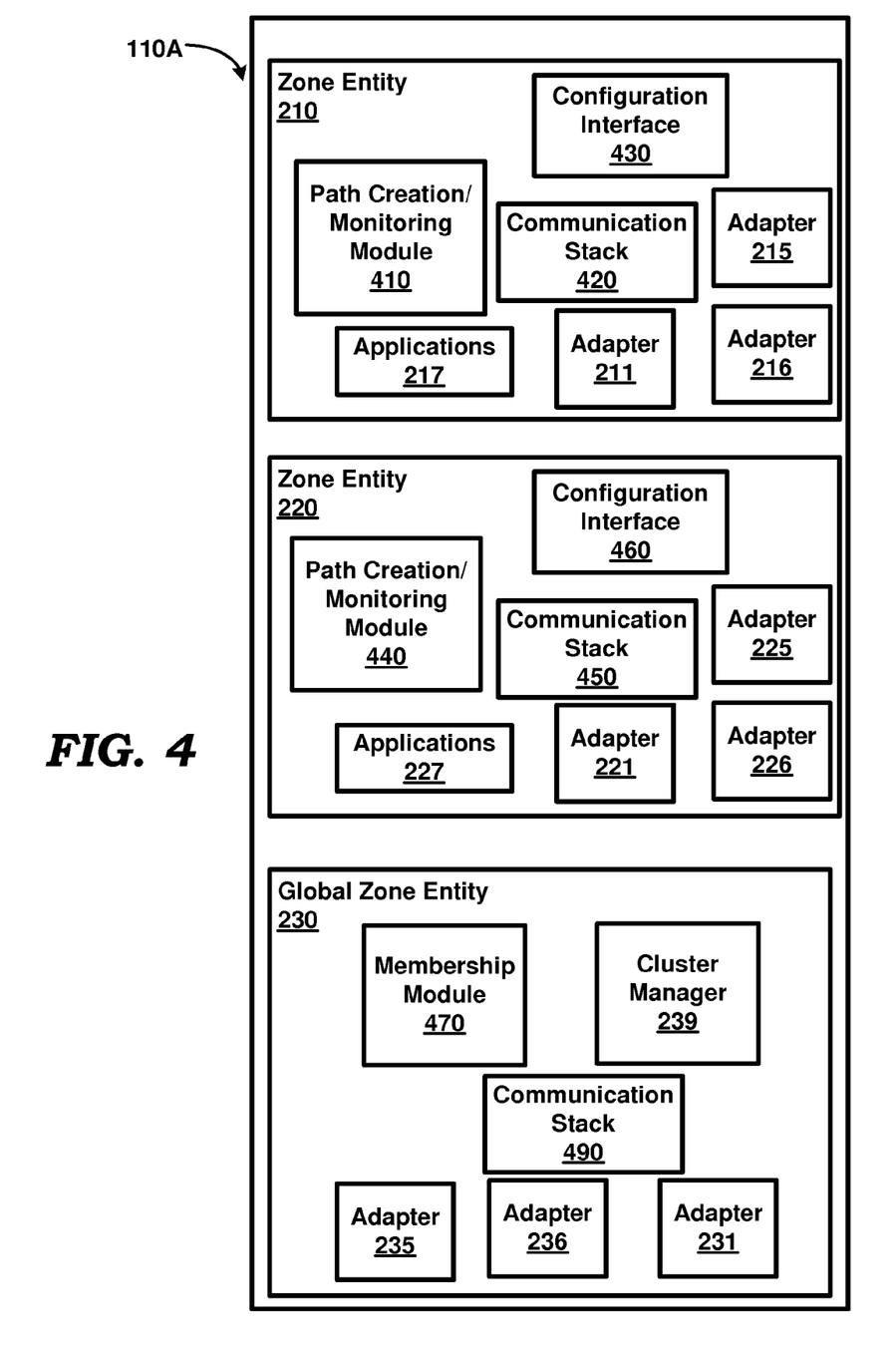
FIG. 4 is a block diagram illustrating the details of implementation of a server system in an embodiment.

FIG. 4 is a block diagram illustrating the implementation of server 110A in one embodiment. The concepts of the description are applicable to other servers 110B/110C as well, though the description below is with respect to server 110A. The block diagram is shown containing extensions with reference to FIG. 2, for ease of understanding. Thus, the diagram is shown containing path creation/monitoring module 410, communication stack 420, and configuration interface 430, in addition to the blocks shown in FIG. 2 of zone entity 210. Similarly, zone entity 220 is shown with additional blocks 440, 450 and 460 in addition. Global zone entity 230 is shown containing membership module 470 and communication stack 490, in addition.

Each of communication stacks 420, 450 and 490 (along with corresponding adapters) provide at least network level (in ISO's OSI model or IP equivalent in TCP/IP model) data services using exclusive resources, similar to exclusive TCP/IP stacks described above (and are thus referred to as exclusive communication stacks). Thus, application 217 may invoke appropriate software instructions of communication stack 420 (in particular IP) to send and/or receive data. Due to the dedicated resources, the applications may receive predictable throughput performance in addition to security protection (e.g., against snooping from applications in other zone entities).

Each of communication stacks 420, 450 and 490 controls the communication (transmit/receipt) of data packets on corresponding private interconnects. For example, communication stack 420 controls the transmission/receipt of data packets on private paths 218/219 (via respective adapters 215/216 and 255/256) to/from a corresponding stack (not shown) in zone entity 250. The respective communication stacks may be viewed as 'driving' the corresponding path (218/219 in the example).

Each configuration interface 430/460 enables an administrator to administer the corresponding zone entity as a corresponding virtual machine.

In a zone cluster (e.g., 280), the path creation/monitoring module (e.g., 410 in zone entity 210 and its peer path creation/monitoring module in zone entity 250) forms software communication paths (e.g., 218/219) between the associated zone entities (e.g., 210 and 250) over the private interconnect.

Each path creation/monitoring module 410/440 (which can be implemented as a part of corresponding cluster software) checks whether communication paths to other zone entities in the same zone cluster are non-operational, and upon detecting non-operational status, informs membership module 470 of the corresponding status. Once a path is detected to be in non-operational status, path creation/monitoring module 410 continues to check whether the communication path has become operational, and the corresponding status change is also notified to membership module. As noted above with respect to step 330, failure of communication link/path to other zone entities of the same zone cluster represents an example situation of failure, and path creation/monitoring modules can be extended for monitoring other failure situations, as desirable in the specific environment.

Membership module 470 receives updates of changes in operational status (failure and restoration) of various zone entities (including connecting paths), and determines the specific members of each zone cluster, by communicating with membership modules in other servers. Thus, if communication between zone entities 210 and 250 of cluster 280 fails, membership module 470 may communicate with the corresponding module in server 110B, and decide which of the two entities 210 and 250 is to remain in membership list of the corresponding zone cluster (while the other one is removed from the membership list). Membership module 470 may examine other relevant parameters (e.g., the operability otherwise of the respective zone entities) in deciding which of the entities is to be retained in the membership list of the zone cluster. Similarly, when a zone entity becomes operational again, membership module 470 may decide to add the zone entity to the membership list of the zone cluster. Although shown external to (or separate from) cluster manager 239, membership module 470 may be contained within cluster manager 239, and accordingly some of the functions are described interchangeably between the two blocks.

Cluster manager 239, responsive to the determination of removal of a member zone entity (by membership module 470) operates (in conjunction with cluster software 212/252) to transfer out the corresponding applications to one of the remaining active zone entities of the same zone cluster, and to communicate to other cluster managers the removal of the zone entity from the zone cluster. Similarly, when a member zone entity becomes operational, the addition of the zone entity (to the zone cluster) is informed to the other cluster managers as well, such that the zone entity can host applications (including those previously transferred out due to detection of entity failure) in the clustered environment. The transfer of applications from one zone entity to another in the same configured zone cluster can be performed in a known way. Cluster manager 239 may also operate in conjunction with the corresponding cluster software (212 and 222) to start, stop, and monitor the execution of the corresponding applications (217 and 227) in corresponding zone entities (210 and 220) of the corresponding zone clusters (280 and 290).

Once an application is thus transferred to a new zone, according to aspects of the present invention, the transferred applications also can make use of the exclusive TCP/IP stack in the new zone.

It should be further appreciated that the features described above can be implemented in various embodiments as a desired combination of one or more of hardware, executable modules, and firmware. The description is continued with respect to an embodiment in which various features are operative when the executable modules described above are executed.

7. Digital Processing System

Figure 5:
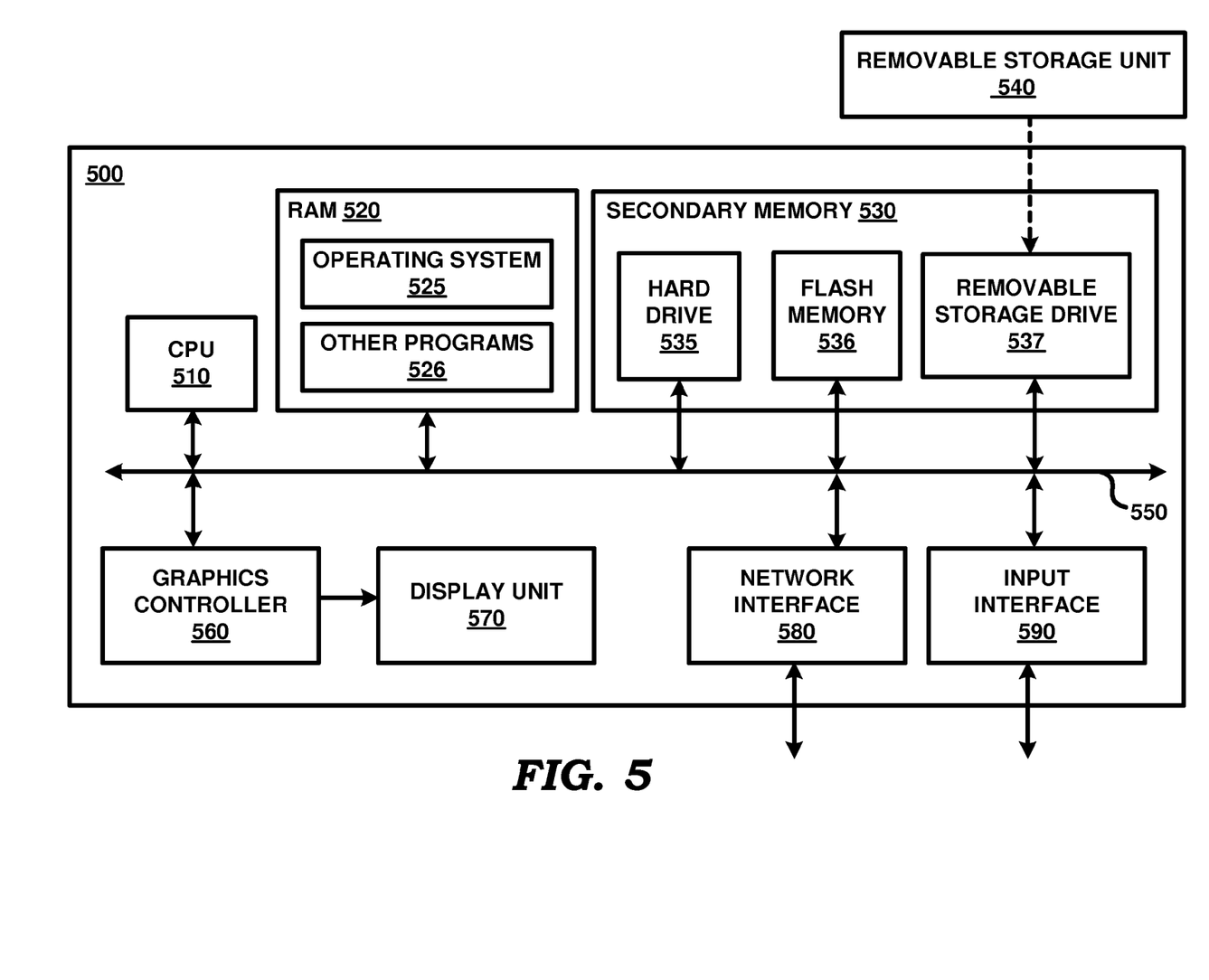
FIG. 5 is a block diagram illustrating the details of a digital processing system in which various aspects of the present invention are operative by execution of appropriate software instructions.

FIG. 5 is a block diagram illustrating the details of digital processing system 500 in which various aspects of the present invention are operative by execution of appropriate software instructions. Digital processing system 500 may correspond to one of servers (e.g., 110A-110C) which implements various features described above.

Digital processing system 500 may contain one or more processors such as a central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general-purpose processing unit.

RAM 520 may receive instructions from secondary memory 530 (non-transitory and non-volatile memory) using communication path 550. RAM 520 is shown currently containing software instructions constituting operating system 525 and/or other code/programs 526 (implementing applications 217/227). In addition to operating system 525, RAM 520 may contain other software programs such as device drivers, operating systems, virtual machines, etc., which provide a (common) run time environment for execution of code/programs/applications (in the form of execution entities).

Graphics controller 560 generates display signals (e.g., in RGB format) to display unit 570 based on data/instructions received from CPU 510. Display unit 570 contains a display screen to display the images defined by the display signals. Input interface 590 may correspond to a keyboard and a pointing device (e.g., touch-pad, mouse) and may be used to provide inputs. Network interface 580 (containing various adapters noted above) provides connectivity to a network (e.g., using Internet Protocol), and may be used to communicate with other systems connected to the network.

Secondary memory 530 may contain hard drive 535, flash memory 536, and removable storage drive 537. Secondary memory 530 may store the data (for example, in the form of one or more files organized as a file system) and software instructions, which enable digital processing system 500 to provide several features in accordance with the present invention.

Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present invention described above. Thus, the executable modules of FIG. 4 representing, for example, path creation/monitoring modules, communication stacks, configuration interfaces, etc., cluster manager 239, membership module 470. etc., may be stored in secondary memory 530.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

8. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of executing applications, said method comprising:

providing a plurality of zone entities and a plurality of zone clusters based on a plurality of servers including a first server and a second server, each of said plurality of servers providing a corresponding subset of zone entities, with each zone entity executing as a corresponding virtual machine in supporting execution of corresponding applications in the zone entity, each zone cluster containing a respective zone entity from the corresponding subset of zone entities on each server of said plurality of servers, wherein the zone entities in each zone cluster operate simultaneously as respective members of the zone cluster, wherein said plurality of zone entities includes a first zone entity, a second zone entity and a third zone entity, wherein said first zone entity is provided on said first server and both of said second zone entity and said third zone entity are provided on said second server, wherein both of said first zone entity and said second zone entity, but not said third zone entity, are members of a first zone cluster of said plurality of zone clusters, wherein applications executing in each zone entity can be moved only to other zone entities of the same zone cluster in which the zone entity is a member of, wherein each zone entity is provided a corresponding exclusive communication stack such that no two zone entities share the same communication stack;

executing a first application in said first zone entity, wherein said first application uses a first exclusive communication stack for sending and receiving packets to/from systems external to said first server, said first exclusive communication stack being provided exclusively for said first zone entity;

detecting failure of said first zone entity;

determining said second zone entity as a suitable zone entity in view of said first zone entity and said second zone entity being members of said first zone cluster; and moving said first application to said suitable zone entity, wherein said first application executing in said second zone entity uses a second exclusive communication stack to communicate with systems external to said second server, said second exclusive communication stack being provided exclusively for said second zone entity, wherein said moving and said determining are performed in response to said detecting of failure of said first zone entity.

2. The method of claim 1, wherein a first adapter on said first zone entity and a corresponding adapter on said second zone entity couple said first zone entity to said second zone entity forming a private communication path, wherein said private communication path is driven by said first exclusive communication stack in said first server system and by said second exclusive communication stack in said second server system.

3. The method of claim 2, wherein each of said first exclusive communication stack and said second exclusive communication stack comprises a corresponding TCP/IP stack, and said failure comprises absence of a private communication path between said first zone entity and said second zone entity on said private communication path.

4. The method of claim 2, further comprising:

maintaining a membership list corresponding to each of said zone cluster, said membership list for a zone cluster specifying the presently available zone entities in the zone cluster such that a first membership list corresponding to said first zone cluster contains said first zone entity when said first zone entity is operational;

moving applications executing in said first zone entity to said second zone entity and then removing said first zone entity from said first membership list in response to said detecting of failure, and adding said first zone entity again to said first membership list when said first zone entity becomes operational thereafter such that said first zone entity is thereafter available for execution of said applications also executing in said second zone entity.

5. The method of claim 4, wherein a second adapter couples said second zone entity to external clients over a network.

6. The method of claim 5, wherein each of said first adapter and said second adapter represents a dedicated physical adapter.

7. The method of claim 1, wherein each of said plurality of servers is implemented as a respective physical server, wherein all zone entities of said first zone cluster are addressable by a public IP address, which is plumbed on the adapter of only one of the zone entities comprised in said first zone cluster at any given time, wherein said one of the zone entities is designed to forward packets destined for other zone entities of said first zone cluster.

8. A non-transitory machine readable medium storing one or more sequences of instructions, wherein execution of said one or more instructions by one or more processors contained in a first server causes said first server to perform the actions of:

providing a plurality of zone entities and a plurality of zone clusters based on a plurality of servers including a first server and a second server, each of said plurality of servers providing a corresponding subset of zone entities, with each zone entity executing as a corresponding virtual machine in supporting execution of corresponding applications in the zone entity, each zone cluster containing a respective zone entity from the corresponding subset of zone entities on each server of said plurality of servers, wherein the zone entities in each zone cluster operate simultaneously as respective members of the zone cluster, wherein said plurality of zone entities includes a first zone entity, a second zone entity and a third zone entity, wherein said first zone entity is provided on said first server and both of said second zone entity and said third zone entity are provided on said second server, wherein both of said first zone entity and said second zone entity, but not said third zone entity, are members of a first zone cluster of said plurality of zone clusters, wherein applications executing in each zone entity can be moved only to other zone entities of the same zone cluster in which the zone entity is a member of, wherein each zone entity is provided a corresponding exclusive communication stack such that no two zone entities share the same communication stack;

executing a first application in said first zone entity, wherein said first application uses a first exclusive communication stack for sending and receiving packets to/from systems external to said first server, said first exclusive communication stack being provided exclusively for said first zone entity;

detecting failure of said first zone entity;

determining said second zone entity as a suitable zone entity in view of said first zone entity and said second zone entity being members of said first zone cluster; and moving said first application to said suitable zone entity, wherein said first application when executed in said second zone entity uses a second exclusive communication stack to communicate with systems external to said second server, wherein said second exclusive communication stack is provided exclusively for said second zone entity, wherein said moving and said determining are performed in response to said detecting of failure of said first zone entity.

9. The non-transitory machine readable medium of claim 8, wherein each of said plurality of servers is implemented as a respective physical server, wherein a first adapter on said first zone entity and a corresponding adapter on said second zone entity couple said first zone entity to said second zone entity forming a private communication path, wherein said private communication path is driven by said first exclusive communication stack in said first server system and by said second exclusive communication stack in said second server system, wherein all zone entities of said zone cluster are addressable by a public IP address, which is plumbed on the adapter of only one of the zone entities comprised in said zone cluster at any given time, wherein said one of the zone entities is designed to forward packets destined for other zone entities of said zone cluster.

10. The non-transitory machine readable medium of claim 9, wherein each of said first communication stack and said second communication stack comprises a corresponding TCP/IP stack, and said failure comprises absence of a private communication path between said first zone entity and said second zone entity on said private interconnect.

11. The non-transitory machine readable medium of claim 10, further comprising:

maintaining a membership list corresponding to each of said zone cluster, said membership list for a zone cluster specifying the presently available zone entities in the zone cluster such that a first membership list corresponding to said first zone cluster contains said first zone entity when said first zone entity is operational;

moving applications executing in said first zone entity to said second zone entity and then removing said first zone entity from said first membership list in response to said detecting of failure, and adding said first zone entity again to said first membership list when said first zone entity becomes operational thereafter such that said first zone entity is thereafter available for execution of said applications also executing in said second zone entity.

12. The non-transitory machine readable medium of claim 11, wherein a second adapter couples said second zone entity to external clients over a network.

13. A computing system comprising:
a first server providing a first plurality of zone entities including a first zone entity, with each zone entity executing as a corresponding virtual machine in supporting execution of corresponding applications in the zone entity,
each zone entity being part of a corresponding one of a plurality of zone clusters, wherein said first zone entity is a member of a first zone cluster of said plurality of zone clusters,
each of said first plurality of zone entities being provided a corresponding one of a first plurality of exclusive communication stacks; and
a second server providing a second plurality of zone entities including a second zone entity and a third zone entity,
each zone entity being part of a corresponding one of said plurality of zone clusters, wherein said second zone entity, but not said third zone entity, is a member of said first zone cluster,
each of said second plurality of zone entities being provided a corresponding one of a second plurality of exclusive communication stacks,
wherein said first zone entity in said first plurality of zone entities operates simultaneously with said second zone entity in said second plurality of zone entities,
wherein applications executing in each zone entity can be moved only to other zone entities of the same zone cluster in which the zone entity is a member of,
wherein said first server comprises a processor and a memory, said processor to retrieve instructions from said memory and execute the retrieved instructions to cause said first server to be operable to:
detect failure of said first zone entity provided on said first server;
determine said second zone entity of said second server as a suitable zone entity in view of said first zone entity and said second zone entity being members of said first zone cluster of said plurality of zone clusters, and operating to support corresponding executing applications; and
move applications in said first zone entity to said suitable zone entity,
wherein said move and said determine are performed in response to said detection of failure of said first zone entity.

14. The computing system of claim 13, wherein an application executes in said first zone entity during a first duration, said application communicating with external systems using a first exclusive communication stack of said first plurality of exclusive communication stacks in said first duration,
said application being moved to said second zone entity of said second plurality of zone entities after said first duration, said application communicating with external systems using a second exclusive communication stack of said second plurality of exclusive communication stacks in a second duration after being moved to said second zone entity.

15. The computing system of claim 14, wherein each of said first exclusive communication stack and said second exclusive communication stack comprises a corresponding TCP/IP stack,
wherein each of said first server and said second server is implemented as a respective physical server,
wherein all zone entities of said first zone cluster are addressable by a public IP address, which is plumbed on the adapter of only one of the zone entities comprised in said first zone cluster at any given time,
wherein said one of the zone entities is designed to forward packets destined for other zone entities of said first zone cluster.

16. The computing system of claim 15, wherein each of said first server and said second server maintains a corresponding membership list for said first zone cluster,
wherein the corresponding membership list specifies the presently available zone entities in said first zone cluster such that the corresponding membership list contains said first zone entity when said first zone entity is operational,
wherein said first zone entity is removed from said corresponding membership list in response to detecting of said failure, and
wherein said first zone entity is added again to said corresponding membership list when said first zone entity becomes operational thereafter such that said first zone entity is thereafter available for execution of said application.

17. The computing system of claim 13, wherein a first adapter on said first zone entity and a corresponding adapter on said second zone entity couple said first zone entity to said second zone entity forming a private communication path,
wherein said private communication path is driven by said first exclusive communication stack in said first server system and by said second exclusive communication stack in said second server system.

* * * * *

UNITED STATES PATENT AND TRADEMARK OFFICE
CERTIFICATE OF CORRECTION

PATENT NO. : 9,495,257 B2
APPLICATION NO. : 13/779731
DATED : November 15, 2016
INVENTOR(S) : Das et al.

It is certified that error appears in the above-identified patent and that said Letters Patent is hereby corrected as shown below:

On the Title Page

Column 1, under Inventors, Line 3, Delete "Bhubanesnwar" and insert -- Bhubaneswar --, therefor.

In the Specification

In Column 4, Line 30, after "290" insert -- . --.

Signed and Sealed this
Sixth Day of June, 2017

Michelle K. Lee
*Director of the United States Patent and Trademark Office*